(12) United States Patent
Li et al.

(10) Patent No.: US 11,407,173 B2
(45) Date of Patent: Aug. 9, 2022

(54) LIGHT VALVE PANEL AND MANUFACTURING METHOD THEREOF, THREE-DIMENSIONAL PRINTING SYSTEM AND METHOD

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jinyu Li, Beijing (CN); Yanchen Li, Beijing (CN); Haobo Fang, Beijing (CN); Yu Zhao, Beijing (CN); Dawei Feng, Beijing (CN); Dong Wang, Beijing (CN); Wang Guo, Beijing (CN); Hailong Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 156 days.

(21) Appl. No.: 16/824,083

(22) Filed: Mar. 19, 2020

(65) Prior Publication Data

US 2021/0129437 A1     May 6, 2021

(30) Foreign Application Priority Data

Oct. 30, 2019   (CN) .......................... 201911045595.1

(51) Int. Cl.
*B29C 64/277*     (2017.01)
*B33Y 30/00*     (2015.01)
(Continued)

(52) U.S. Cl.
CPC .......... *B29C 64/277* (2017.08); *B29C 64/129* (2017.08); *B29C 64/393* (2017.08);
(Continued)

(58) Field of Classification Search
None
See application file for complete search history.

(56) References Cited

U.S. PATENT DOCUMENTS 10,989,973 B2    4/2021   Xi et al.
2018/0081229 A1*   3/2018   Ono .................... G02F 1/13471
(Continued)

FOREIGN PATENT DOCUMENTS

| CN | 108681146 A | 10/2018 |
|---|---|---|
| CN | 109143703 A | 1/2019 |

(Continued)

OTHER PUBLICATIONS

Chinese Office Action in Chinese Application No. 201911045595.1 dated Oct. 11, 2021 with English translation.

*Primary Examiner* — Matthew J Daniels
*Assistant Examiner* — Paul Spiel
(74) *Attorney, Agent, or Firm* — Collard & Roe, P.C.

(57) ABSTRACT

A light valve panel and a manufacturing method thereof, a three-dimensional printing system, and a three-dimensional printing method are disclosed. The light valve panel includes a first light valve array substrate and at least one second light valve array substrate, the first light valve array substrate and the at least one second light valve array substrate are arranged in a stack; the first light valve array substrate includes a plurality of first pixel units arranged in an array, and the second light valve array substrate includes a plurality of second pixel units arranged in an array; and an orthographic projection of at least one of the second pixel
(Continued)

units on the first light valve array substrate partially overlaps with at least one of the first pixel units.

9 Claims, 7 Drawing Sheets

(51) Int. Cl.
   *B29C 64/129*    (2017.01)
   *G02F 1/1343*    (2006.01)
   *G02F 1/1347*    (2006.01)
   *B33Y 10/00*     (2015.01)
   *B33Y 50/02*     (2015.01)
   *B29C 64/393*    (2017.01)

(52) U.S. Cl.
   CPC ............... *B33Y 10/00* (2014.12); *B33Y 30/00* (2014.12); *B33Y 50/02* (2014.12); *G02F 1/1347* (2013.01); *G02F 1/134309* (2013.01); *G02F 2201/121* (2013.01); *G02F 2201/123* (2013.01)

(56) References Cited

U.S. PATENT DOCUMENTS

| | | | |
|---|---|---|---|
| 2020/0103687 A1* | 4/2020 | Chang | G02F 1/1347 |
| 2020/0122394 A1* | 4/2020 | Sheng | G02B 13/24 |
| 2021/0318574 A1 | 10/2021 | Lv et al. | |

FOREIGN PATENT DOCUMENTS

| | | |
|---|---|---|
| CN | 109795113 A | 5/2019 |
| CN | 110202788 A | 9/2019 |
| CN | 110293675 A | 10/2019 |
| KR | 10-2017-0116841 A | 10/2017 |

* cited by examiner

LIGHT VALVE PANEL AND MANUFACTURING METHOD THEREOF, THREE-DIMENSIONAL PRINTING SYSTEM AND METHOD

The application claims priority to the Chinese patent application No. 201911045595.1, filed on Oct. 30, 2019, and for all purposes under the U.S. Patent Law, the entire disclosure of the aforementioned application is incorporated by reference as part of the disclosure of this application.

TECHNICAL FIELD

Embodiments of the present disclosure relate to a light valve panel and a manufacturing method thereof, a three-dimensional printing system, and a three-dimensional printing method.

BACKGROUND

Three-dimensional (3D) printing is a new rapid prototyping manufacturing technology, and products are manufactured based on the principle of multi-layer stacking generation, which can overcome the special structure obstacle that traditional mechanical processing cannot implement and can simplify the generation of any complex structure component. The stereo lithography apparatus is currently widely used 3D printing technology. The principle of the stereo lithography apparatus is to irradiate a photopolymer or a liquid resin with a light source, and cure the photopolymer or the liquid resin to obtain a printed product.

SUMMARY

At least one embodiment of the present disclosure provides a light valve panel, and the light valve panel includes a first light valve array substrate and at least one second light valve array substrate, the first light valve array substrate and the at least one second light valve array substrate are arranged in a stack; the first light valve array substrate comprises a plurality of first pixel units arranged in an array; the second light valve array substrate comprises a plurality of second pixel units arranged in an array; and an orthographic projection of at least one of the second pixel units on the first light valve array substrate partially overlaps with at least one of the first pixel units.

For example, in the light valve panel provided by at least one embodiment of the present disclosure, the orthographic projection of at least one of the second pixel units on the first light valve array substrate partially overlapping with at least one of the first pixel units comprises: the orthographic projection of at least one of the second pixel units on the first light valve array substrate partially overlaps with at least one of the first pixel units in a first direction and a second direction, respectively, or the orthographic projection of at least one of the second pixel units on the first light valve array substrate partially overlaps with at least one of the first pixel units in the first direction, or the orthographic projection of at least one of the second pixel units on the first light valve array substrate partially overlaps with at least one of the first pixel units in the second direction; and both the first direction and the second direction are parallel to a plane in which the first light valve array substrate is located, and the first direction is perpendicular to the second direction.

For example, in the light valve panel provided by at least one embodiment of the present disclosure, the orthographic projection of at least one of the second pixel units on the first light valve array substrate partially overlaps with four adjacent first pixel units, and the four adjacent first pixel units are in two rows and two columns, respectively.

For example, in the light valve panel provided by at least one embodiment of the present disclosure, an area of an overlapping region of the at least one of the second pixel units with each of the four adjacent first pixel units is identical.

For example, in the light valve panel provided by at least one embodiment of the present disclosure, the first light valve array substrate comprises: a first base layer, and a first common electrode layer and a first pixel electrode layer which are sequentially provided on the first base layer, and the first pixel electrode layer comprises a plurality of first pixel electrodes corresponding to the plurality of first pixel units, and the plurality of first pixel electrodes are arranged in an array; the second light valve array substrate comprises: a second base layer, and a second common electrode layer and a second pixel electrode layer which are sequentially provided on the second base layer, and the second pixel electrode layer comprises a plurality of second pixel electrodes corresponding to the plurality of second pixel units, and the plurality of second pixel electrodes are arranged in an array; the light valve panel further comprises a first liquid crystal layer, and the first liquid crystal layer is provided between the first pixel electrode layer and the second pixel electrode layer; and the orthographic projection of at least one of the second pixel units on the first light valve array, substrate partially overlapping with at least one of the first pixel units comprises: an orthographic projection of at least one of the second pixel electrodes in the second light valve array substrate on the first base layer partially overlaps with an orthographic projection of at least one of the first pixel electrodes on the first base layer.

For example, in the light valve panel provided by at least one embodiment of the present disclosure, the orthographic projection of at least one of the second pixel electrodes in the second light valve array substrate on the first base layer partially overlapping with the orthographic projection of at least one of the first pixel el des on the first base layer comprises: an orthographic projection of any one of the second pixel electrodes in the second light valve array substrate on the first base layer partially overlaps with the orthographic projection of at least one of the first pixel electrodes on the first base layer.

For example, in the light valve panel provided by at least one embodiment of the present disclosure, the first light valve array substrate comprises: a third base layer, a third pixel electrode layer, a second liquid crystal layer, a third common electrode layer, and a fourth base layer, the third base layer, the third pixel electrode layer, the second liquid crystal layer, the third common electrode layer and the fourth base layer are sequentially stacked, and the third pixel electrode layer comprises a plurality of third pixel electrodes corresponding to the plurality of first pixel units, and the plurality of third pixel electrodes, arranged in an array; the second light valve array substrate comprises: a fifth base layer, a fourth pixel electrode layer, a third liquid crystal layer, a fourth common electrode layer, and a sixth base layer, the fifth base layer, the fourth pixel electrode layer, the third liquid crystal layer, the fourth common electrode layer and the sixth base layer are sequentially stacked, and the fourth pixel electrode layer comprises a plurality of fourth pixel electrodes corresponding to the plurality of second pixel units, and the plurality of fourth pixel electrodes are arranged in an array; and the orthographic projection of at least one of the second pixel units on the first light valve array substrate partially overlapping with at least one of the first pixel units comprises: an orthographic projection of at least one of the fourth pixel electrodes in the second light valve array substrate on the third base layer partially overlaps with an orthographic projection of at least one of the third pixel electrodes on the third base layer.

For example, in the light valve panel provided by at least one embodiment of the present disclosure, the orthographic projection of at least one of the fourth pixel electrodes in the second light valve array substrate on the third base layer partially overlapping with the orthographic projection of at least one of the third pixel electrodes on the third base layer comprises: an orthographic projection of any one of the fourth pixel electrodes in the second light valve array substrate on the third base layer partially overlaps with the orthographic projection of at least one of the third pixel electrodes on the third base layer.

For example, in the light valve panel provided by at least one embodiment of the present disclosure, the third base layer and the fifth base layer are an identical base layer, or the third base layer and the sixth base layer are an identical base layer, or the fourth base layer and the fifth base layer are an identical base layer, or the fourth base layer and the sixth base layer are an identical base layer.

For example, in the light valve panel provided by at least one embodiment of the present disclosure, the at least one second light valve array substrate comprises two or more second light valve array substrates, and an orthographic projection of at least one second pixel unit in one of any two second light valve array substrates on the first light valve array substrate partially overlaps with an orthographic projection of at least one second pixel unit in another one of the any two second light valve array substrates on the first light valve array substrate.

For example, in the light valve panel provided by at least one embodiment of the present disclosure, the first light valve array substrate and the second light valve array substrate are identical, and the first light valve array substrate and the second light valve array substrate are staggered in the first direction and the second direction, or the first light valve array substrate and the second light valve array substrate are staggered in the first direction, or the first light valve array substrate and second light valve array substrate are staggered in the second direction.

At least one embodiment of the present disclosure further provides a method for manufacturing a light valve panel, including: providing a first light valve array substrate and at least one second light valve array substrate, respectively, where the first light valve array substrate comprises a plurality of first pixel units arranged in an array, and the second light valve array substrate comprises a plurality of second pixel units arranged in an array; and stacking the first light valve array substrate with the at least one second light valve array substrate, where an orthographic projection of at least one of the second pixel units on the first light valve array substrate partially overlaps with at least one of the first pixel units.

At least one embodiment of the present disclosure further provides a three-dimensional printing system, the system includes a light source and the light valve panel provided by any one of the embodiments of the present disclosure, and the light valve panel is on a light-emitting side of the light source.

For example, the three-dimensional printing system provided by at least one embodiment of the present disclosure further includes a controller, and the controller is in signal connection to the first light valve array substrate and the second light valve array substrate of the light valve panel, respectively; and the controller is configured to obtain a first exposure pattern for the first light valve array substrate and a second exposure pattern for the second light valve array substrate according to a print pattern, and is further configured to control the light valve panel to provide the first exposure pattern and control the light valve panel to provide the second exposure pattern, and the print pattern is obtained by superimposing the first exposure pattern and the second exposure pattern.

For example, in the three-dimensional printing system provided by at least one embodiment of the present disclosure, the first light valve array substrate comprises: a first base layer, and a first common electrode layer and a first pixel electrode layer which are sequentially provided on the first base layer, and the first pixel electrode layer comprises a plurality of first pixel electrodes corresponding to the plurality of first pixel units, and the plurality of first pixel electrodes are arranged in an array; the second light valve array substrate comprises: a second base layer, and a second common electrode layer and a second pixel electrode layer which are sequentially provided on the second base layer, and the second pixel electrode layer comprises a plurality of second pixel electrodes corresponding to the plurality of second pixel units, and the plurality of second pixel electrodes are arranged in an array; the first light valve array substrate further comprises a first liquid crystal layer, and the first liquid crystal layer is provided between the first pixel electrode layer and the second pixel electrode layer; an orthographic projection of any one of the second pixel electrodes in the second light valve array substrate on the first base layer partially overlaps with an orthographic projection of at least one of the first pixel electrodes on the first base layer; the controller is further configured to provide a signal of the first exposure pattern to the first pixel electrode layer, and provide a common voltage signal to the first common electrode layer, the second pixel electrode layer, and the second common electrode layer, so as to control the light valve panel to provide the first exposure pattern; and the controller is further configured to provide a signal of the second exposure pattern to the second pixel electrode layer, and provide a common voltage signal to the first common electrode layer, the first pixel electrode layer, and the second common electrode layer, so as to control the light valve panel to provide the second exposure pattern.

For example, in the three-dimensional printing system provided by at least one embodiment of the present disclosure, the first light valve array substrate comprises a third base layer, a third pixel electrode layer, a second liquid crystal layer, a third common electrode layer, and a fourth base layer, the third base layer, the third pixel electrode layer, the second liquid crystal layer, the third common electrode layer and the fourth base layer are sequentially stacked, and the third pixel electrode layer comprises a plurality of third pixel electrodes corresponding to the plurality of first pixel units, and the plurality of third pixel electrodes are arranged in an array; the second light valve array substrate comprises a fifth base layer, a fourth pixel electrode layer, a third liquid crystal layer, a fourth common electrode layer, and a sixth base layer, the fifth base layer, the fourth pixel electrode layer, the third liquid crystal layer, the fourth common electrode layer and the sixth base layer are sequentially stacked, and the fourth pixel electrode layer comprises a plurality of fourth pixel electrodes corresponding to the plurality of second pixel units, and the plurality of fourth pixel electrodes are arranged in an array; an orthographic projection of any one of the fourth pixel electrodes in the second light valve array substrate on the third base layer partially overlaps with an orthographic projection of at least one of the third pixel electrodes on the third base layer; the controller is further configured to provide a signal of the first exposure pattern to the third pixel electrode layer, and provide a common voltage signal to the third common electrode layer, the fourth pixel electrode layer, and the fourth common electrode layer, so as to control the light valve panel to provide the first exposure pattern; and controller is further configured to provide a signal of the second exposure pattern to the fourth pixel electrode layer, and provide a common voltage signal to the fourth common electrode layer, the third pixel electrode layer, and the third common electrode layer, so as to control the light valve panel to provide the second exposure pattern.

At least one embodiment of the present disclosure further provides a three-dimensional printing method applicable to the three-dimensional printing system provided by any one of the embodiments of the present disclosure, and the three-dimensional printing method includes: performing a first exposure on a printing material through the light valve panel to obtain an initial printing layer; and performing at least one second exposure on the printing material through the light valve panel to obtain an edge-softened printing layer.

For example, in the three-dimensional printing method provided by at least one embodiment of the present disclosure, performing the first exposure on the printing material through the light valve panel to obtain the initial printing layer, comprises: allowing the light valve panel to display a first exposure pattern, and performing the first exposure on the printing material through the light valve panel, so as to obtain the initial printing layer; performing at least one second exposure on the printing material through the light valve panel to obtain the edge-softened printing layer, comprises: allowing the light valve panel to display a second exposure pattern, and performing at least one second exposure on the printing material through the light valve panel, so as to obtain the edge-softened printing layer; and the second exposure pattern is different from the first exposure pattern.

For example, in the three-dimensional printing method provided by at least one embodiment of the present disclosure, the first light valve array substrate comprises: a first base layer, and a first common electrode layer and a first pixel electrode layer which are sequentially provided on the first base layer, and the first pixel electrode layer comprises a plurality of first pixel electrodes corresponding to the plurality of first pixel units, and the plurality of first pixel electrodes are arranged in an array; the second light valve array, substrate comprises: a second base layer, and a second common electrode layer and a second pixel electrode layer which are sequentially provided on the second base layer, and the second pixel electrode layer comprises a plurality of second pixel electrodes corresponding to the plurality of second pixel units, and the plurality of second pixel electrodes are arranged in an array; a first liquid crystal layer is provided between the first pixel electrode layer and the second pixel electrode layer; an orthographic projection of any one of the second pixel electrodes in the second light valve array substrate on the first base layer partially overlaps with an orthographic projection of at least one of the first pixel electrodes on the first base layer; allowing the light valve panel to display the first exposure pattern comprises: providing a signal of the first exposure pattern to the first pixel electrode layer, and providing a common voltage signal to the first common electrode layer, the second pixel electrode layer, and the second common electrode layer; and allowing the light valve panel to display the second exposure pattern comprises: providing a signal of the second exposure pattern to the second pixel electrode layer, and providing a common voltage signal to the first common electrode layer, the first pixel electrode layer, and the second common electrode layer.

For example, in the three-dimensional printing method provided by at least one embodiment of the present disclosure, the first light valve array substrate comprises a third base layer, a third pixel electrode layer, a second liquid crystal layer, a third common electrode layer, and a fourth base layer, the third base layer, the third pixel electrode layer, the second liquid crystal layer, the third common electrode layer and the fourth base layer are sequentially stacked, and the third pixel electrode layer comprises a plurality of third pixel electrodes corresponding to the plurality of first pixel units, and the plurality of third pixel electrodes are arranged in an array; the second light valve array substrate comprises a fifth base layer, a fourth pixel electrode layer, a third liquid crystal layer, a fourth common electrode layer, and a sixth base layer, the fifth base layer, the fourth pixel electrode layer, the third liquid crystal layer, the fourth common electrode layer and the sixth base layer are sequentially stacked, and the fourth pixel electrode layer comprises a plurality of fourth pixel electrodes corresponding to the plurality of second pixel units, and the plurality of fourth pixel electrodes are arranged in an array; an orthographic projection of any one of the fourth pixel electrodes in the second light valve array substrate on the third base layer partially, overlaps with an orthographic projection of at least one of the third pixel electrodes on the third base layer; allowing the light valve panel to display the first exposure pattern comprises: providing a signal of the first exposure pattern to the third pixel electrode layer, and providing a common voltage signal to the third common electrode layer, the fourth pixel electrode layer, and the fourth common electrode layer; and allowing the light valve panel to display the second exposure pattern comprises: providing a signal of the second exposure pattern to the fourth pixel electrode layer, and providing a common voltage signal to the fourth common electrode layer, the third pixel electrode layer, and the third common electrode layer.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

REFERENCE NUMERALS

Figure 1:
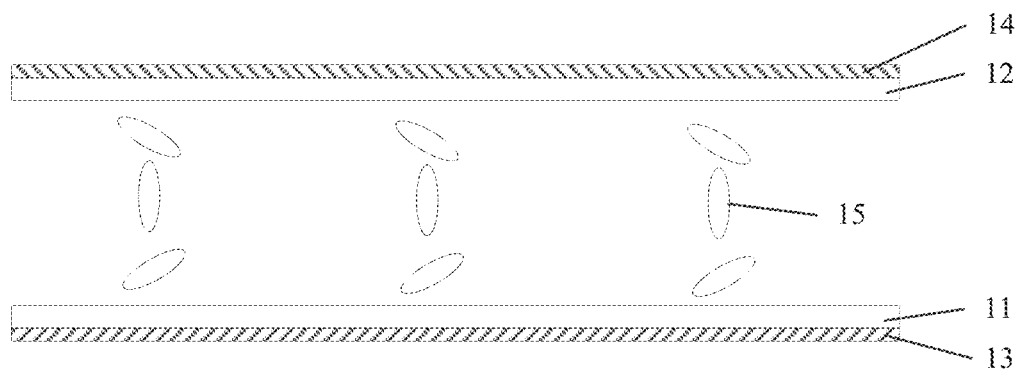
FIG. 1 is a schematic structural diagram of a light valve panel provided by at least one embodiment of the present disclosure.

10—light valve panel; 11, 31, 51—first light valve array substrate; 12, 32, 52, 53—second light valve array substrate; 13, 33, 56—first polarizer; 14, 34, 57—second polarizer; 15—first liquid crystal layer; 20—light source; 21—material trough; 22—printing table; 23—printing material; 25—controller; 35—first adhesive layer; 54—second adhesive layer; 55—third adhesive layer; 110—first base layer; 101—gate electrode layer; 102—first insulating layer; 103—active layer; 104—second insulating layer; 105—drain electrode; 106—source electrode; 107—third insulating layer; 112—first pixel electrode layer; 113—first common electrode layer; 301—third base layer; 302—third pixel electrode layer; 303—second liquid crystal layer; 304—third common electrode layer; 305—fourth base layer; 306—fifth base layer; 307—fourth pixel electrode layer; 308—third liquid crystal layer; 309—fourth common electrode layer; 310—sixth base layer; P1—first pixel unit; P2, P3—second pixel unit.

DETAILED DESCRIPTION in order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Currently, in a 3D printing system using a stereo lithography apparatus, a projector is used to display a single pattern of each layer. For example, when the projector displays a pattern (including a light-transmitting region and a non-light-transmitting region), the light emitted by the light source passes through the light-transmitting region to illuminate the photopolymer or liquid resin and cure the photopolymer or liquid resin, so as to complete the print of one layer, and then a product with a three-dimensional structure is formed by layer-by-layer printing. However, because the pattern of each layer projected by the projector includes a plurality of rectangular pixels, when printing a pattern with a winding or curved (such as circular) edge, the contour of the winding or curved edge may be in a stepped shape, which affects the smoothness of the edge contour, thereby affecting the surface smoothness of the printed object and affecting the 3D printing effect.

At least one embodiment of the present disclosure provides a light valve panel and a manufacturing method thereof, a three-dimensional printing system, and a three-dimensional printing method. The light valve panel provided by the embodiments of the present disclosure can be used as a light source shielding structure to replace the projector used in the related technology of the stereo lithography apparatus to implement three-dimensional printing.

The light valve panel provided by at least one embodiment of the present disclosure includes a first light valve array substrate and at least one second light valve array substrate, the first light valve array substrate and the at least one second light valve array substrate are arranged in a stack. The first light valve array substrate includes a plurality of first pixel units arranged in an array, the second light valve array substrate includes a plurality of second pixel units arranged in an array, and an orthographic projection of at least one of the second pixel units on the first light valve array substrate partially overlaps with at least one of the first pixel units.

It should be noted that, in the embodiments of the present disclosure, the orthographic projection of at least one of the second pixel units on the first light valve array substrate partially overlapping with at least one of the first pixel units indicates that the orthographic projection of each of the at least one of the second pixel units on the first light valve array substrate includes a portion that does not overlap with the at least one of the first pixel units. For example, in the case where the orthographic projection of one second pixel unit on the first light valve array substrate partially overlaps with one first pixel unit, the orthographic projection of the second pixel unit on the first light valve array substrate includes a portion that does not overlap with the first pixel unit.

For example, in some embodiments, when the above light valve panel is used for exposure, the light valve panel may display a desired exposure pattern, and therefore the light valve panel may also be referred to as a display panel.

For example, the first light valve array substrate and the second light valve array substrate respectively include a plurality of gate lines and a plurality of data lines which are crossed and insulated, and the gate lines and the data lines may cross to define a plurality of pixel units arranged in an array. For example, two adjacent gate lines and two adjacent data lines may cross to define a pixel unit.

In an exemplary embodiment, the orthographic projection of at least one of the second pixel units on the first light valve array substrate partially overlapping with at least one of the first pixel units may include: the orthographic projection of at least one of the second pixel units on the first light valve array substrate partially overlaps with at least one of the first pixel units in a first direction and a second direction, respectively; or the orthographic projection of at least one of the second pixel units on the first light valve array substrate partially overlaps with at least one of the first pixel units in the first direction; or the orthographic projection of at least one of the second pixel units on the first light valve array substrate partially overlaps with at least one of the first pixel units in the second direction. Both the first direction and the second direction are parallel to a plane in which the first light valve array substrate is located, and the first direction is perpendicular to the second direction.

In an exemplary embodiment, the orthographic projection of at least one of the second pixel units on the first light valve array substrate partially overlaps with four adjacent first pixel units, and in some examples, an area of an overlapping region of the orthographic projection of the second pixel unit on the first light valve array substrate with each of the four adjacent first pixel units is identical. The four adjacent first pixel units are located in two rows and two columns, respectively, that is, the four adjacent first pixel units are arranged in a 2×2 array. However, the embodiments of the present disclosure are not limited in this aspect. In other embodiments, the area of the overlapping regions of the orthographic projection of the second pixel unit on the first light valve array substrate with the four adjacent first pixel units may be different.

In an exemplary embodiment, when the number of the second light valve array substrates is two or more, an orthographic projection of the second pixel unit in one of any two second light valve array substrates on the first light valve array substrate partially overlaps with an orthographic projection of the second pixel unit in the other one of the any two second light valve array substrates on the first light valve array substrate. In other words, the orthographic projection of the second pixel unit in one of any two second light valve array, substrates on the first light valve array substrate has a certain staggering distance and does not completely overlap with the orthographic projection of the second pixel unit in the other one of the any two second light valve array substrates on the first light valve array substrate.

The light valve panel provided by the embodiments of the present disclosure has a structure of at least two layers of pixel units, and the at least two layers of pixel units are appropriately staggered. Therefore, in the three-dimensional printing process, by controlling the pixel units of different layers to display different exposure patterns, a higher printing DPI (dots per inch) can be implemented, thereby improving the accuracy of 3D printing and improving the surface smoothness of 3D printed objects.

Hereinafter, the technical solutions of the embodiments of the present disclosure are described in detail through several specific embodiments.

FIG. 1 is a schematic structural diagram of a light valve panel provided by at least one embodiment of the present disclosure. As illustrated in FIG. 1, the light valve panel includes: a first light valve array substrate 11 and a second light valve array substrate 12 which are opposite, a first liquid crystal layer 15 between the first light valve array substrate 11 and the second light valve array substrate 12, a first polarizer 13 on a side of the first light valve array substrate 11 away from the first liquid crystal layer 15, and a second polarizer 14 on a side of the second light valve array substrate 12 away from the first liquid crystal layer 15. For example, an absorption axis direction of the first polarizer 13 is perpendicular to an absorption axis direction of the second polarizer 14.

In this case, the light valve panel is a liquid crystal light valve panel. When the light valve panel is used for exposure, for example, during the exposure process of 3D printing, the light valve panel can display a desired exposure pattern, and therefore the light valve panel may also be referred to as a liquid crystal display panel.

For example, in some examples, the first light valve array substrate 11 includes: a first base layer, a first common electrode layer and a first pixel electrode layer which are sequentially provided on the first base layer, and a first pixel driving array provided on the first base layer. The first pixel electrode layer includes a plurality of first pixel electrodes corresponding to the plurality of first pixel units, and the plurality of first pixel electrodes are arranged in an array. For example, the first pixel electrode layer and the first common electrode layer are disposed in different layers, and the first common electrode layer may be located between the first base layer and the first pixel electrode layer. The first pixel driving array may include: thin film transistors in an array arrangement, data lines, and gate lines. Each of the first pixel electrodes may be controlled by a thin film transistor and connected to a data line and a gate line. For example, a black matrix may be provided in a region corresponding to the first pixel driving array.

For example, the second light valve array substrate 12 includes: a second base layer, a second common electrode layer and a second pixel electrode layer which are sequentially provided on the second base layer, and a second pixel driving array provided on the second base layer. The second pixel electrode layer includes a plurality of second pixel electrodes corresponding to the plurality of second pixel units, and the plurality of second pixel electrodes are arranged in an array. For example, the second pixel electrode layer and the second common electrode layer are disposed in different layers, and the second common electrode layer may be located between the second base layer and the second pixel electrode layer. The second pixel driving array may include: thin film transistors in an array arrangement, data lines, and gate lines. Each of the second pixel electrodes may be controlled by a thin film transistor and connected to a data line and a gate line. For example, a black matrix may be provided in a region corresponding to the second pixel driving array.

In this embodiment, the orthographic projection of at least one of the second pixel units on the first light valve array substrate partially overlapping with at least one of the first pixel units may include: an orthographic projection of at least one of the second pixel electrodes in the second light valve array substrate on the first base layer partially overlaps with an orthographic projection of at least one of the first pixel electrodes on the first base layer.

For example, in some examples, an orthographic projection of any one of the second pixel electrodes in the second light valve array substrate on the first base layer partially overlaps with the orthographic projection of at least one of the first pixel electrodes on the first base layer.

Figure 2:
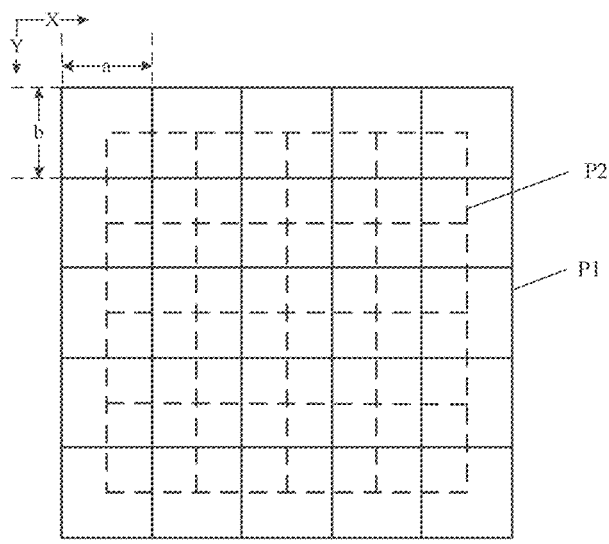
FIG. 2 is a schematic diagram of alignment of two layers of pixel units of a light valve panel provided by at least one embodiment of the present disclosure.

For example, FIG. 2 is a schematic diagram of alignment of two layers of pixel units of a light valve panel provided by at least one embodiment of the present disclosure. As illustrated in FIG. 2, the shape and size of the second pixel unit P2 may be identical to those of the first pixel unit P1, and for example, the second pixel unit P2 and the first pixel unit P1 are both in a rectangular shape with a length of a and a width of b. In this example, the orthographic projection of the second pixel unit P2 on the first light valve array, substrate and the first pixel unit P1 are staggered by a/2 in the X direction (corresponding to the above-mentioned first direction) and staggered by b/2 in the Y direction (corresponding to the above-mentioned second direction). In other words, the distance between the center position of the orthographic projection of the second pixel unit P2 on the first light valve array substrate and the center position of the first pixel unit P1 in the X direction is a/2, and the distance between the center position of the orthographic projection of the second pixel unit P2 on the first light valve array substrate and the center position of the first pixel unit P1 in the Y direction is b/2. Moreover, in this example, as illustrated in FIG. 2, the orthographic projection of the second pixel unit P2 on the first light valve array substrate has overlapping regions with four adjacent first pixel units P1 (located in two rows and two columns), and the overlapping regions with the four adjacent first pixel units P1 have the same area. However, the embodiments of the present disclosure are not limited in this aspect. For example, the orthographic projection of the second pixel unit P2 on the first light valve array substrate and the first pixel unit P1 may be staggered by a/2 in the X direction only, or may be staggered by b/2 in the Y direction only.

In this embodiment, the structure of the second light valve array substrate 12 is similar to the structure of the first light valve array substrate 11. The orthographic projection of the second pixel electrode in the second light valve array substrate 12 on the first light valve array substrate H is staggered with the first pixel electrode, and the orthographic projection of the second pixel electrode on the first light valve array substrate 11 partially overlaps with the first pixel electrode. By allowing the second pixel electrode to be appropriately staggered with the first pixel electrode, the first pixel unit and the second pixel unit can be appropriately staggered, thereby implementing a smaller printing unit.

The light valve panel provided by the embodiments of the present disclosure may be a liquid crystal light valve panel (also referred to as a liquid crystal display panel) with a double-layer pixel unit structure, and may adopt a twisted nematic (TN) display mode. However, the embodiments of the present disclosure are not limited in this aspect. In other implementations, other display modes may be used.

In this embodiment, by applying voltage control to the first pixel electrode layer, the second pixel electrode layer, the first common electrode layer, and the second common electrode layer, the pixel units of the light valve panel can be driven to be completely light-transmitting or non-light-transmitting, that is, display a black-and-white pattern, in which the black region is the non-light-transmitting region, and the white region is the light-transmitting region. The light source is used to illuminate through the light valve panel for exposing the printing material in 3D printing, thereby implementing 3D printing.

The technical solutions of the embodiments are further illustrated below through the description of the manufacturing process of the light valve panel of this embodiment. The "patterning process" mentioned in the embodiments includes processes such as depositing a film layer, coating a photoresist, exposing with a mask, developing, etching, removing a photoresist, and the like, and is a traditional preparation process in related technologies. Deposition may be performed by using known processes such as sputtering, evaporation, chemical vapor deposition, etc., coating may be performed by using known coating processes, and etching may be performed by using known methods, which are not specifically limited herein. In the description of the embodiments, it should be understood that the "film" refers to a layer of a film made of a certain material on a base substrate by deposition or other processes. If the "film" does not require a patterning process during the entire the manufacturing process, the "film" may also be referred to as a "layer". If the "film" requires a patterning process during the entire manufacturing process, it is referred to as a "film" before the patterning process, and referred to as a "layer" after the patterning process. The "layer" after the patterning process includes at least one "pattern".

For example, a method for manufacturing a light valve panel includes the following manufacturing steps (1) to (3).

Figure 3:
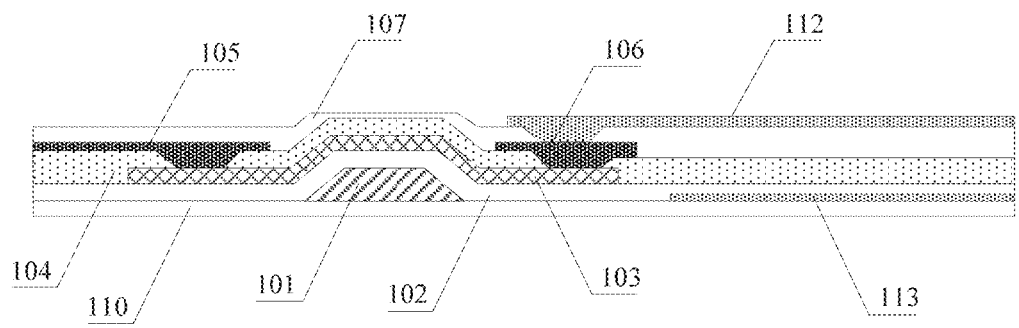
FIG. 3 is a schematic structural diagram of a first light valve array substrate of a light valve panel provided by at least an embodiment of the present disclosure.

Step (1): providing the first light valve array substrate and the second light valve array substrate. For example, providing the first light valve array substrate and the second light valve array substrate includes preparing the first light valve array substrate and the second light valve array substrate. For example, the first light valve array substrate and the second light valve array substrate have similar structures, and the following is described by taking the preparation of the first light valve array substrate as an example with reference to FIG. 3.

For example, preparing the first light valve array substrate includes the following steps 1 to 7.

Step 1: forming a gate layer pattern, a first common electrode layer pattern, and a gate line pattern on the first base layer. Forming the gate layer pattern, the first common electrode layer pattern, and the gate line pattern on the first base layer may include: depositing a first metal film on a first base layer 110, and patterning the first metal film through a patterning process to form a pattern of a gate layer 101 and a pattern of a gate line (not shown); and depositing a first conductive film on the first base layer 110 formed with the above structure, and patterning the first conductive film through a patterning process to form a pattern of a first common electrode layer 113.

For example, the first base layer 110 may be a flexible substrate, and a material such as polyimide (PI), polyethylene terephthalate (PET), or a surface-processed polymer soft film may be used.

For example, the first conductive film may adopt a light-transmitting conductive material, such as indium tin oxide (ITO) or indium zinc oxide (IZO).

For example, the first metal film may adopt a metal material, such as silver (Ag), copper (Cu), aluminum (Al), molybdenum (Mo), etc., or an alloy material of the above metal, such as aluminum-niobium alloy (AlNb), molybdenum-niobium alloy (MoNb), etc. The first metal film may include a plurality of metal layers, such as Mo/CulMo, etc., or may be a stacked structure formed of the metal and the transparent conductive material, such as ITO/Ag/ITO.

Step 2: forming a first insulating layer. Forming the first insulating layer may include: depositing a first insulating film on the first base layer 110 formed with the above structure to form a first insulating layer 102.

For example, the first insulating film may adopt silicon nitride (SiNx), silicon oxide (SiOx), silicon oxynitride (SiON), etc., and may be a single layer, multiple layers, or a composite layer.

Step 3: forming an active layer pattern. Forming the active layer pattern may include: depositing an active layer film on die first base layer 110 formed with the above structure, and patterning the active layer film through a patterning process to form a pattern of an active layer 103.

For example, the active layer film may adopt amorphous indium gallium dine oxide (a-IGZO), zinc oxynitride (ZnON), indium zinc tin oxide (IZTO), amorphous silicon (a-Si), polysilicon (p-Si), hexa-thiophene, polythiophene or other materials.

Step 4: forming a second insulating layer pattern. Forming the second insulating layer pattern may include: depositing a second insulating film on the first base layer 110 formed with the above structure, and patterning the second insulating film through a patterning process to form a pattern of a second insulating layer 104. For example, first via holes are formed in the second insulating layer 104 to expose the surfaces of two ends of the active layer 103, respectively.

For example, the second insulating film may adopt silicon nitride (SiNx), silicon oxide (SiOx), silicon oxynitride (SiON), or the like, and may be a single layer, multiple layers, or a composite layer.

Step 5: forming a source electrode pattern and a drain electrode pattern. Forming the source electrode pattern and the drain electrode pattern may include: depositing a second metal film on the first base layer 110 formed with the above structure, and patterning the second metal film through a patterning process to form a pattern of a drain electrode 105, a pattern of a source electrode 106, and a pattern of a data line (not shown).

For example, the second metal film may adopt a metal material, such as silver (Ag), copper (Cu), aluminum (Al), molybdenum (Mo), etc., or an alloy material of the above metal, such as aluminum-niobium alloy (AlNb), molybdenum-niobium alloy (MoNb), etc. The second metal film may include a plurality of metal layers, such as Mo/Cu/Mo, etc., or may be a stacked structure formed of the metal and the transparent conductive material, such as ITO/Ag/ITO.

Step 6: forming a third insulating layer pattern. Forming the third insulating layer pattern may include: coating a third insulating film on the first base layer 110 formed with the above structure, and forming a pattern of a third insulating layer 107 covering the above structure through a photolithography process including mask exposure and development. For example, a second via hole is formed in the third insulating layer 107 to expose the source electrode 106.

For example, the material of the third insulating film includes, but is not limited to, a poly-siloxane-based material, an acrylic-based material, or a polyimide-based material. For example, the third insulating layer 107 can be referred to as a planarization layer (PNL).

Step 7: forming a first pixel electrode layer pattern. Forming the first pixel electrode layer pattern may include: forming a second conductive film on the first base layer 110 formed with the above structure, and patterning the second conductive film through a patterning process to form a pattern of a first pixel electrode layer 112.

For example, the second conductive film may be made of ITO or IZO.

In the above process, a black matrix may also be formed in a corresponding region of the thin film transistor (for example, above or below the thin film transistor). For example, the black matrix may be formed on the first base layer. However, the embodiments of the present disclosure are not limited in this aspect.

In addition, it should be noted that, in the above example, the case where the first common electrode layer 113 and the gate layer 101 are provided in the same layer is taken as an example for description. However, the embodiments of the present disclosure are not limited in this aspect, as long as the first common electrode layer and the first pixel electrode layer are provided in different layers, and the first common electrode layer is located between the first base layer and the first pixel electrode layer. For example, in other implementations, the first common electrode layer may be first formed on the first base layer, and then the thin film transistor and the first pixel electrode layer are sequentially formed after the insulating layer is formed.

Step (2): assembling the first light valve array substrate with the second light valve array substrate to form a cell, filling liquid crystals to the cell, and sealing the cell, so as to form the first liquid crystal layer between the first light valve array substrate and the second light valve array substrate.

For example, the first pixel electrode layer of the first light valve array, substrate faces the second pixel electrode layer of the second light valve array substrate, and the orthographic projection of the second pixel electrode on the first light valve array substrate is appropriately staggered with the first pixel electrode, so that the orthographic projection of the second pixel electrode on the first light valve array substrate partially overlaps with the first pixel electrode.

Step (3): forming the first polarizer on a side of the first light valve array substrate away from the first liquid crystal layer, and forming the second polarizer on a side of the second light valve array substrate away from the first liquid crystal layer.

The preparation process of steps (2) and (3) can be with reference to the preparation process of the liquid crystal light valve panel in the related technologies, and details are not described herein again.

The embodiments of the present disclosure provide the light valve panel with a double-layer pixel unit structure based on the liquid crystal display principle, which can be used for three-dimensional printing. By using the structure design of allowing two layers of pixel units to be appropriately staggered, a smaller printing unit (i.e., a higher printing DPI) can be implemented in 3D printing, thereby improving the accuracy of 3D printing and improving the surface smoothness of 3D printed objects.

In addition, the manufacturing process of the light valve, panel provided by the embodiments of the present disclosure has good compatibility, high implementation ability, strong practicability, and good application prospect.

At least one embodiment of the present disclosure further provides a three-dimensional printing system, and the three-dimensional printing system includes a light source and the light valve panel according to any one of the above embodiments. For example, the light valve panel is located on a light-emitting side of the light source.

Figure 4:
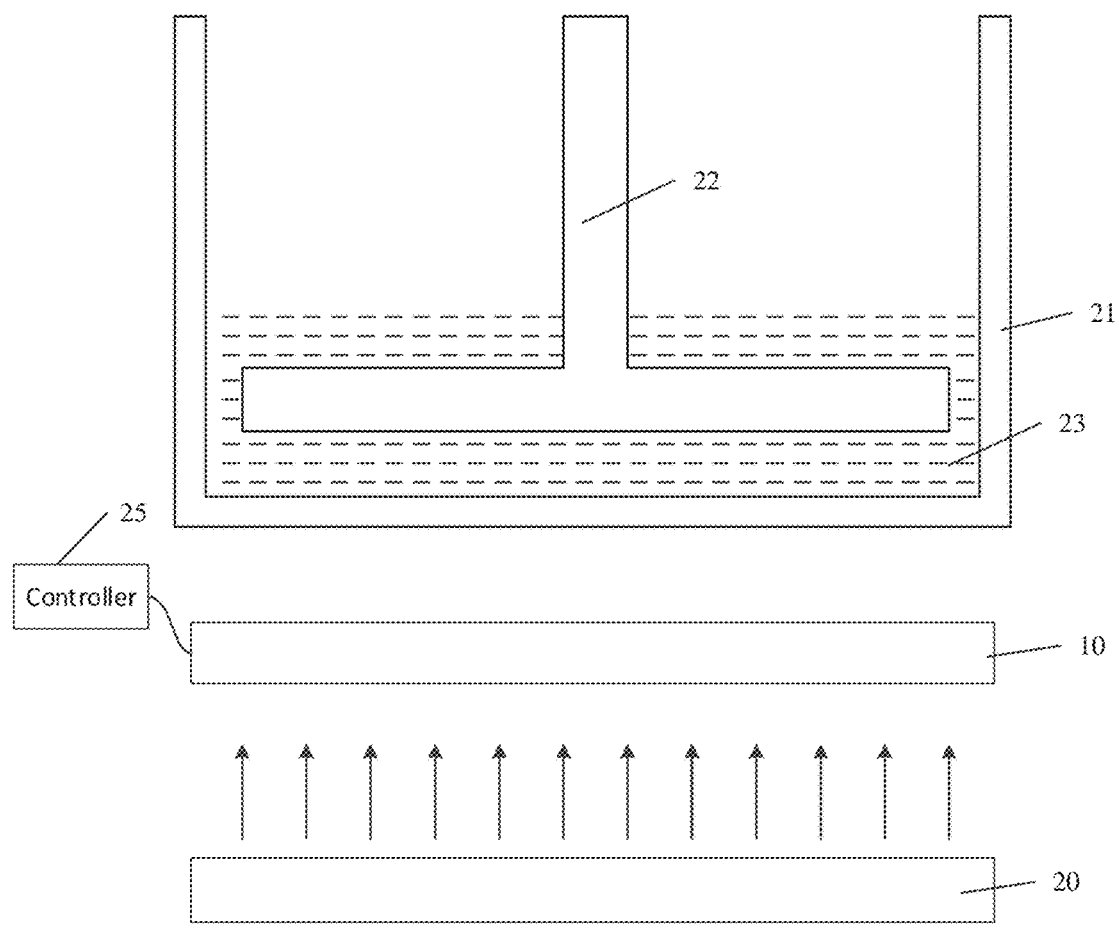
FIG. 4 is a schematic diagram of a three-dimensional printing system provided by at least one embodiment of the present disclosure.

For example, FIG. 4 is a schematic diagram of a three-dimensional printing system provided by at least one embodiment of the present disclosure. As illustrated in FIG. 4, the three-dimensional printing system may include: a light source 20, a light valve panel 10, a transparent material trough 21, a printing table 22, and a controller 25. For example, the light valve panel 10 is located on the light-emitting side of the light source 20, and the material trough 21 is located on the light-emitting side of the light valve panel 10. A liquid printing material 23 is provided in the material trough 21, and the printing material 23 may be a photopolymer or a resin solution. The lower surface of the printing table 22 is immersed in the liquid printing material 23, and the lower surface of the printing table 22 can be moved up and down in the material trough 21. The light emitted by the light source 20 can cure the printing material 23 in the material trough 21.

When performing three-dimensional printing, the controller 25 may first obtain the shape of an object through software, and the software will process the shape into layers of information, so as to obtain the information of each layer, that is, to obtain a printing pattern of each layer. The lower surface of the printing table 22 is immersed in the printing material 23 in the material trough 21, and the distance between the lower surface of the printing table 22 and the upper surface of the bottom of the material trough 21 is the thickness of a layer of the object. The light valve panel 10 can sequentially display at least two exposure patterns corresponding to the first printing layer, and the light emitted by the light source 20 performs at least two partial exposures on the printing material 23 between the lower surface of the printing substrate 22 and the upper surface of the bottom of the material trough 21 through the light valve panel 10, so as to form the first printing layer. Then, the printing table 22 rises a distance of one layer thickness, the light valve panel 10 sequentially displays at least two exposure patterns corresponding to the second layer, the light emitted by the light source 20 performs at least two partial exposures on the printing material 23 between the printed first layer and the upper surface of the bottom of the material trough 21 through the light valve panel 10, so as to form the second layer, and so on until the object is printed.

In this example, the light source 20 is a backlight source, and may be various types of backlight sources, such as a surface light source, a line light source, etc. However, the embodiments of the present disclosure are not limited in this aspect. For example, in other implementations, the light source and the light valve panel may be located above the material trough, and the upper surface of the printing table is located at the light-emitting side of the light valve panel and may be moved up and down in the material trough.

Hereinafter, the three-dimensional printing process of the three-dimensional printing system is described by taking the case where the light valve panel 10 in the three-dimensional printing system provided by the embodiments uses the light valve panel provided by the above embodiments as an example.

Figure 5:
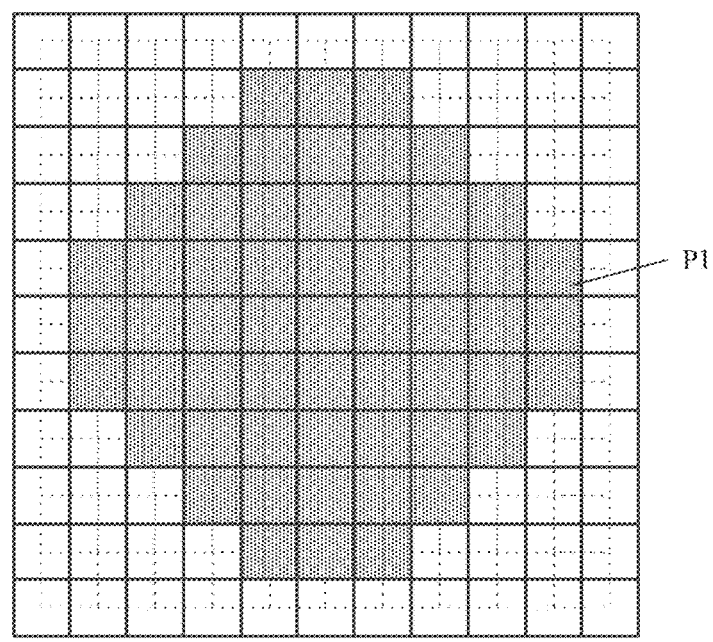
FIG. 5 is an exemplary diagram of a pixel turn-on state of a light valve panel in a first phase provided by at least one embodiment of the present disclosure.

In this embodiment, when performing three-dimensional printing, the printing material is exposed twice through the light valve panel to cure each layer of the object to be printed. For example, for each layer of the object to be printed, the controller 25 may determine a first exposure pattern and a second exposure pattern. In a first phase, the controller 25 controls to provide a signal of the first exposure pattern to the first pixel electrode layer of the first light valve array substrate of the light valve panel 10, and provide a common voltage (VCOM) signal to the second pixel electrode layer of the second light valve array substrate, and simultaneously provide the VCOM signal to the first common electrode layer and the second common electrode layer. In this way, the first pixel electrode overlaps with the first common electrode layer to form a storage capacitor, and the first pixel electrode forms a positive voltage with the second common electrode layer and the second pixel electrode to drive the liquid crystals in the first liquid crystal layer to rotate, so as to allow the light emitted by the light source 20 to selectively pass, so that the printing material 23 at the corresponding position of the printing table 22 is initially exposed and cured. FIG. 5 is an exemplary diagram of a pixel turn-on state of the light valve panel in the first phase. The light valve panel 10 displays the first exposure, pattern by the first pixel unit P1, where the shadow region is the light-transmitting region, and the region outside the shadow region is the non-light-transmitting region. In this way, after the light emitted by the light source 20 passes through the light valve panel 10, the printing material 23 in the region illustrated in FIG. 5 can be cured.

Figure 6:
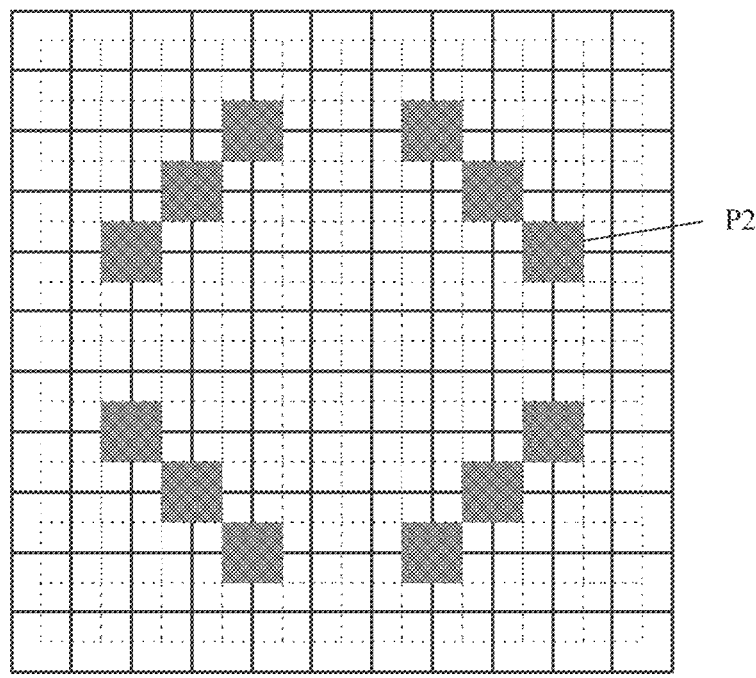
FIG. 6 is an exemplary diagram of a pixel turn-on state of a light valve panel in a second phase provided by at least one embodiment of the present disclosure.

In a second phase, the signal provided to the first light valve array substrate and the signal provided to the second light valve array substrate are interchanged, that is, a signal of the second exposure pattern is provided to the second pixel electrode layer, and the VCOM signal is provided to the first pixel electrode layer, simultaneously, the VCOM signal is also provided to the first common electrode layer and the second common electrode layer. In this way, the second pixel electrode overlaps with the second common electrode layer to form a storage capacitor, and the second pixel electrode forms a positive voltage with the first common electrode layer and the first pixel electrode to drive the liquid crystals in the first liquid crystal layer to rotate, so as to allow the light to selectively pass, so that the printing material 23 at the corresponding position of the printing substrate 22 is secondly exposed and cured. FIG. 6 is an exemplary diagram of a pixel turn-on state of the light valve panel in the second phase. The light valve panel 10 displays the second exposure pattern by the second pixel unit P2, where the shadow region is the light-transmitting region, and the region outside the shadow region is the non-light-transmitting region. In this way, after the light emitted by the light source 20 passes through the light valve panel 10, the printing material 23 in the region illustrated in FIG. 6 can be cured.

Figure 7:
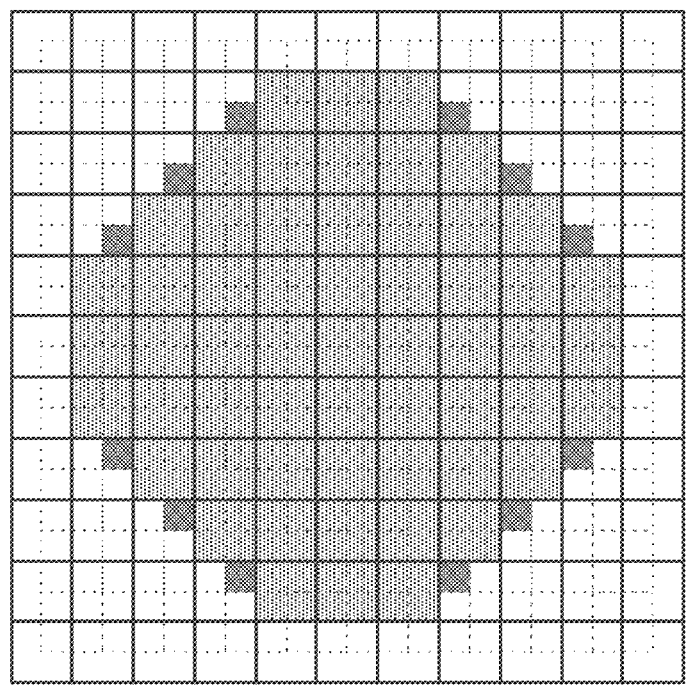
FIG. 7 is an exemplary diagram of a single-layer curing pattern obtained by using a light valve panel provided by at least one embodiment of the present disclosure.

FIG. 7 is an example diagram of a single-layer cured pattern obtained by three-dimensional printing using the above light valve panel. According to the exposure and curing pattern in the first phase illustrated in FIG. 5 and the exposure and curing pattern in the second phase illustrated in FIG. 6, the single-layer print pattern as illustrated in FIG. 7 can be obtained, where the shadow region is the region of the cured printing material. According to the comparison between FIG. 5 and FIG. 7, by adding the exposure and curing process in the second phase illustrated in FIG. 6, the stepped sawtooth of the oblique line portion can be obviously reduced. Further, it can be seen that the stepped edge of the pattern cured in the first phase can be softened during the exposure and curing in the second phase, thereby improving the accuracy of edge printing of the single-layer curing pattern and further improving the surface smoothness of the three-dimensional printed objects.

The embodiments of the present disclosure provide the three-dimensional printing system and the three-dimensional printing method using the light valve panel with a double-layer pixel unit structure based on a liquid crystal display principle. In the embodiments, the appropriate staggering of the double-layer pixel structure of the display substrate and the combination of the exposure and curing operations in two phases can implement a smaller printing unit (i.e., a higher DPI), thereby improving the accuracy of 3D printing and improving the surface smoothness of the three-dimensional printed objects.

Figure 8:
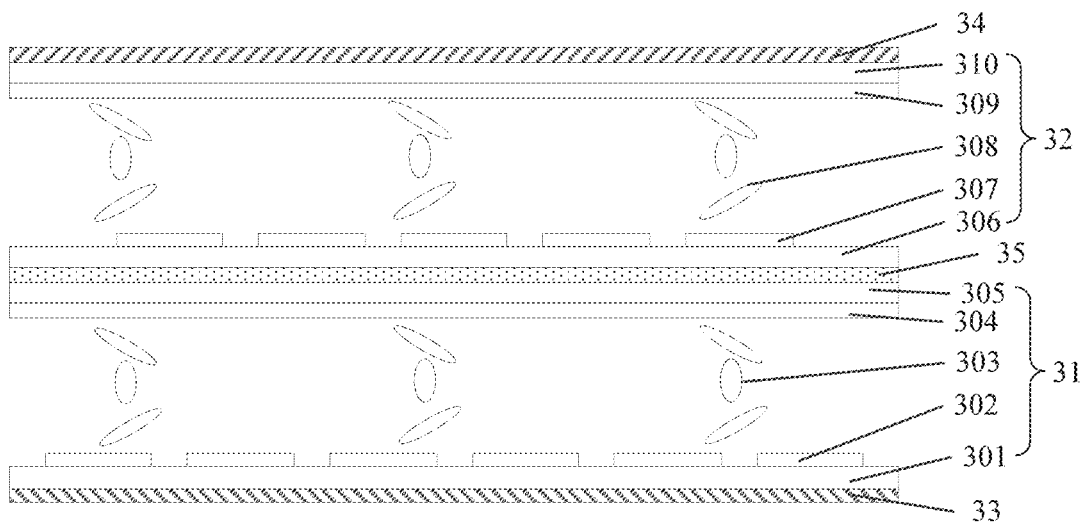
FIG. 8 is a schematic structural diagram of another light valve panel provided by at least one embodiment of the present disclosure.

FIG. 8 is a schematic structural diagram of another light valve panel provided by at least one embodiment of the present disclosure. As illustrated in FIG. 8, the light valve panel includes: a first light valve array substrate 31, a second light valve array substrate 32, a first polarizer 33, a second polarizer 34, and a first adhesive layer 35 (for example, transparent water glue having adhesion function). The first light valve array substrate 31 and the second light valve array substrate 32 are stacked, and the first light valve array substrate 31 and the second light valve array substrate 32 can be attached and fixed by the first adhesive layer 35. For example, both the first light valve array substrate 31 and the second light valve array substrate 32 may be a liquid crystal light valve array substrate or a liquid crystal display substrate, and may use a TN display mode. However, the embodiments of the present disclosure are not limited in this aspect. The preparation process of the first light valve array substrate and the second light valve array substrate provided by the embodiments can be with reference to the preparation process of the liquid crystal light valve array substrate or the liquid crystal display substrate in the related technologies, and details are not described herein again.

In this embodiment, the first light valve array substrate 31 may include: a third base layer 301, a third pixel electrode layer 302, a second liquid crystal layer 303, a third common electrode layer 304, and a fourth base layer 305, the third base layer 301, the third pixel electrode layer 302, the second liquid crystal layer 303, the third common electrode layer 304, and the fourth base layer 305 are sequentially stacked. The third pixel electrode layer 302 includes a plurality of third pixel electrodes corresponding to the plurality of first pixel units, and the plurality of third pixel electrodes are arranged in an array. For example, a third pixel driving array (not shown) may be further provided on the third base layer 301, and the third pixel driving array may include: thin film transistors in an array arrangement, data lines and gate lines. Each of the third pixel electrodes may be controlled by a thin film transistor and connected to a data line and a gate line. For example, a black matrix may be provided in a region corresponding to the third pixel driving array.

For example, the second light valve array substrate 32 may include: a fifth base layer 306, a fourth pixel electrode layer 307, a third liquid crystal layer 308, a fourth common electrode layer 309, and a sixth base layer 310, the fifth base layer 306, the fourth pixel electrode layer 307, the third liquid crystal layer 308, the fourth common electrode layer 309, and the sixth base layer 310 are sequentially stacked. The fourth pixel electrode layer 307 includes a plurality of fourth pixel electrodes corresponding to the plurality of second pixel units, and the plurality of fourth pixel electrodes are arranged in an array. For example, a fourth pixel driving array (not shown) may be further provided on the fifth base layer 306, and the fourth pixel driving array may include: thin film transistors in an array arrangement, data lines and gate lines. Each of the fourth pixel electrodes may be controlled by a thin film transistor and connected to a data line and a gate line. For example, a black matrix may be provided in a region corresponding to the fourth pixel driving array.

In this embodiment, the first light valve array substrate includes a plurality of first pixel units arranged in an array, and the second light valve array substrate includes a plurality of second pixel units arranged in an array. For example, an orthographic projection of at least one of the second pixel units on the first light valve array substrate partially overlaps with at least one of the first pixel units, which may include: an orthographic projection of at least one of the fourth pixel electrodes in the second light valve array substrate on the third base layer partially overlaps with an orthographic projection of at least one of the third pixel electrodes on the third base layer.

For example, an orthographic projection of any one of the fourth pixel electrodes in the second light valve array substrate on the third base layer partially overlaps with the orthographic projection of at least one of the third pixel electrodes on the third base layer.

In this embodiment, the structure of the second light valve array substrate 32 may be similar to the structure of the first light valve array substrate 31. After the first light valve array substrate 31 and the second light valve array substrate 32 are attached to each other, the orthographic projection of the fourth pixel electrode in the second light valve array substrate 32 on the first light valve array substrate 31 is appropriately staggered with the third pixel electrode, and the orthographic projection of the fourth pixel electrode in the second light valve array substrate 32 on the first light valve array substrate 31 partially overlaps with the third pixel electrode, thereby implementing appropriate staggering between the second pixel unit and the first pixel unit. In addition, the staggering relationship between the first pixel unit and the second pixel unit can be with reference to the description in the above embodiments, and details are not described herein again.

It should be noted that the embodiments of the present disclosure are not limited in the types of the first light valve array substrate and the second light valve array, substrate, and the first light valve array substrate and the second light valve array substrate may be other light valve substrates or display substrates which can implement light-transmitting and non-light-transmitting control, as long as the appropriate staggering relationship between the first pixel unit of the first light valve array substrate and the second pixel unit of the second light valve array substrate can be satisfied. For example, in other implementations, the first light valve array substrate and the second light valve array substrate may also be electrophoresis display substrates; or, the first light valve array substrate may be a liquid crystal display substrate, and the second light valve array substrate may be an electrophoresis display substrate, or the like.

For example, in some embodiments, the first light valve array substrate and the second light valve array substrate may be identical, that is, the structures, shapes, and dimensions of the first light valve array substrate and the second light valve array substrate are identical, and the light valve panel is implemented by the staggering between the first light valve array substrate and the second light valve array substrate in the first direction and the second direction. Alternatively, the light valve panel is implemented by the staggering between the first light valve array substrate and the second light valve array substrate in the first direction, or the light valve panel is implemented by the staggering between the first light valve array substrate and the second light valve array substrate in the second direction. Therefore, the first light valve array substrate and the second light valve array substrate can be prepared through the same manufacturing process, thereby simplifying the manufacturing process of the light valve panel.

It should be noted that the present embodiments of the present disclosure do not limit the stacked arrangement relationship between the first light valve array substrate and the second light valve array substrate. For example, in other implementations, the second light valve array substrate may be disposed on the first light valve array substrate, and the sixth base layer is close to the fourth base layer; or the first light valve array substrate may be disposed on the second light valve array substrate, and the third base layer is close to the sixth base layer or the fifth base layer; or the first light valve array substrate may be disposed on the second light valve array substrate, and the fourth base layer is close to the sixth base layer or the fifth base layer.

In this embodiment, when the light valve panel illustrated in FIG. 8 is used for three-dimensional printing, for each layer of the object to be printed, the exposure and curing process are required to be performed twice. In an exemplary embodiment, when the light valve panel is applied to the three-dimensional printing system for three-dimensional printing, in the first phase, the controller may control the first light valve array substrate 31 to operate (i.e., control the first light valve array substrate 31 to display the first exposure pattern) to allow the light emitted by the light source to selectively passes through the first light valve array substrate 31, and control the second light valve array substrate 32 to allow all light to pass through the second light valve array substrate 32 (i.e., the second light valve array substrate 32 is in a fully light-transmitting state), so that the first exposure and curing process is completed. For example, the signal of the first exposure pattern (for example, the pattern illustrated in FIG. 5) is provided to the first pixel electrode of the first light valve array substrate, the common voltage signal is provided to the first common electrode layer of the first light valve array substrate, the signal of the fully light-transmitting state is provided to the second pixel electrode of the second light valve array substrate, and the common voltage signal is provided to the second common electrode layer of the second light valve array substrate.

In the second phase, the controller may control the first light valve array substrate 31 to allow all light emitted by the light source to pass through the first light valve array substrate 31, and control the second light valve array substrate 32 to operate (i.e., control the second light valve array substrate 32 to display the second exposure pattern) to allow the light to selectively pass through the second light valve array substrate 32, so that the second exposure and curing process is performed. For example, the signal of the fully light-transmitting state is provided to the first pixel electrode of the first light valve array substrate, the common voltage signal is provided to the first common electrode layer of the first light valve array substrate, the signal of the second exposure pattern (for example, the pattern illustrated in FIG. 6) is provided to the second pixel electrode of the second light valve array substrate, and the common voltage signal is provided to the second common electrode layer of the second light valve array substrate.

In this way, through two phases of exposure and curing, the stepped edge of the pattern cured in the first phase can be softened during the curing in the second phase, thereby improving the accuracy of edge printing of the single-layer curing pattern and further improving the surface smoothness of 3D printed objects.

Figure 9:
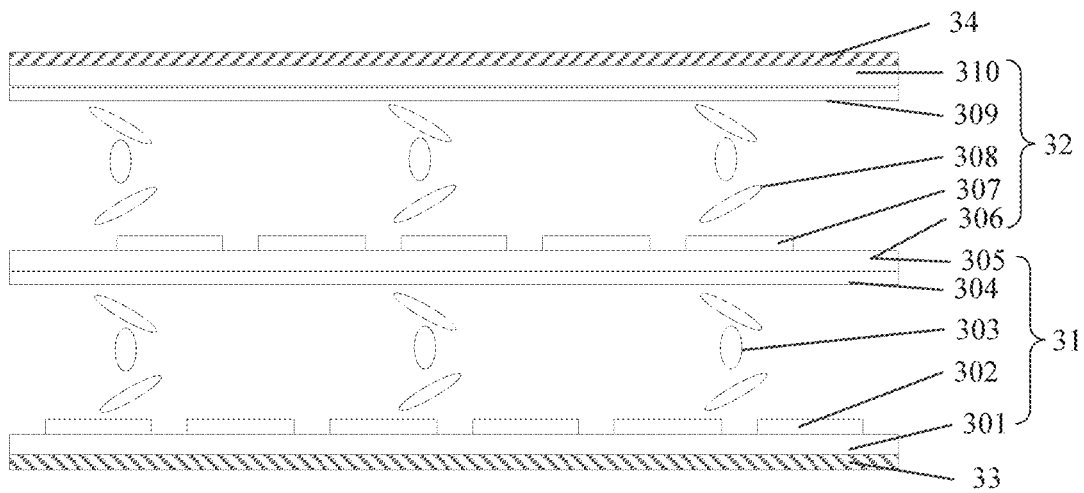
FIG. 9 is a schematic structural diagram of still another light valve panel provided by at least one embodiment of the present disclosure.

FIG. 9 is a schematic structural diagram of still another light valve panel provided by at least one embodiment of the present disclosure. The light valve panel is an extension of the light valve panel illustrated in FIG. 8. The difference between the light valve panel illustrated in FIG. 9 and the light valve panel illustrated in FIG. 8 is that in the light valve panel illustrated in FIG. 9, the first light valve array substrate and the second light valve array substrate share a base layer. As illustrated in FIG. 9, the fourth base layer 305 and the fifth base layer 306 are the same base layer. For example, the fourth pixel electrode layer 307 is disposed on a side, facing the third liquid crystal layer 308, of the fourth base layer 305, and the third common electrode layer 304 is disposed on a side, facing the second liquid crystal layer 303, of the fourth base layer 305. However, the embodiments of the present disclosure are not limited in this aspect. In other implementations, the third base layer and the sixth base layer may be the same base layer; or the fourth base layer and the fifth base layer may be the same base layer; or the fourth base layer and the sixth base layer may be the same base layer.

The method for performing three-dimensional printing with the light valve panel provided by this embodiment can be with reference to the description in the above embodiments, and details are not described herein again.

Figure 10:
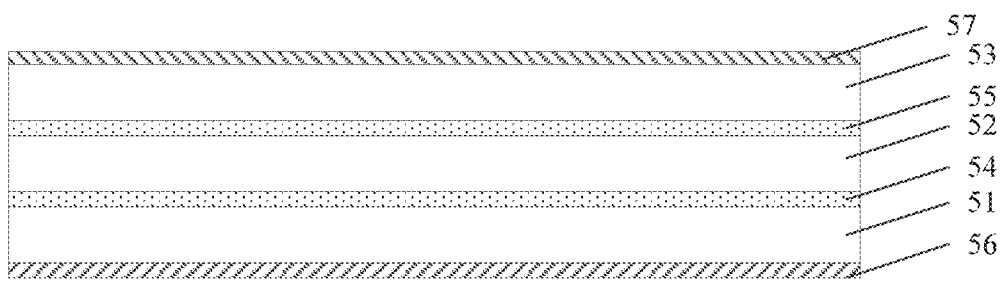
FIG. 10 is a schematic structural diagram of further still another light valve panel provided by at least one embodiment of the present disclosure.

FIG. 10 is a schematic structural diagram of further still another light valve panel provided by at least one embodiment of the present disclosure. The light valve panel is an extension of the light valve panel illustrated in FIG. 8. The difference between the light valve panel illustrated in FIG. 10 and the light valve panel illustrated in FIG. 8 is that in the light valve panel illustrated in FIG. 10, the number of second light valve array substrates is two.

As illustrated in FIG. 10, the light valve panel includes: a first light valve array substrate 51, second light valve array substrates 52 and 53, a second adhesive layer 54, a third adhesive layer 55, a first polarizer 56 and a second polarizer 57. For example, the first light valve array substrate 51 and the second light valve array substrates 52 and 53 are stacked, the first light valve array substrate 51 and the second light valve array substrate 52 are attached through the second adhesive layer 54, and the second light valve array substrates 52 and 53 are attached to each other through the third adhesive layer 55. The second adhesive layer 54 and the third adhesive layer 55 may be transparent water glue having the adhesive effect. However, the embodiments of the present disclosure are not limited in this aspect.

Figure 11:
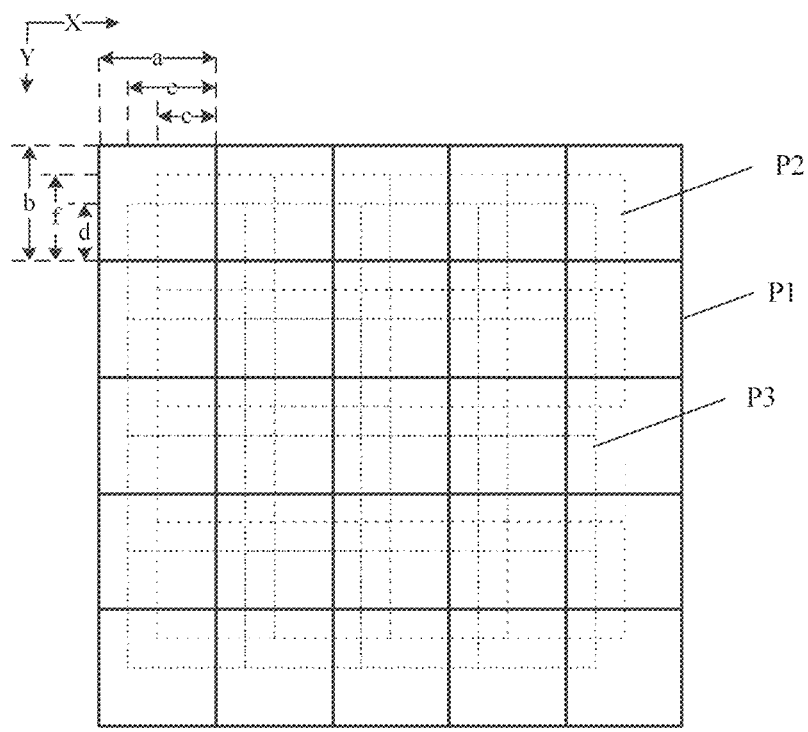
FIG. 11 is a schematic diagram of alignment of three layers of pixel units of a light valve panel provided by at least one embodiment of the present disclosure.

FIG. 11 is a schematic diagram of alignment of three layers of pixel units of the above embodiment. As illustrated in FIG. 11, the first pixel units P1 are arranged in the first light valve array substrate 51, the second pixel units P2 are arranged in the second light valve array substrate 52, and the second pixel units P3 are arranged in the second light valve array substrate 53. As illustrated in FIG. 11, the shapes and sizes of the second pixel units P2 and P3 may be the same with those of the first pixel unit P1, and for example, the first pixel unit P1 and the second pixel units P2 and P3 are in a rectangular shape with a length of a and a width of h.

In this embodiment, the orthographic projection of the second pixel unit P2 on the first light valve array substrate 51 and the first pixel unit P1 are staggered by a distance of a-c in the X direction (corresponding to the above first direction) and by a distance of b-f in the Y direction (corresponding to the above second direction). The orthographic projection of the second pixel unit P3 on the first light valve array substrate 51 and the first pixel unit P1 are staggered by a distance of a-e in the X direction and by a distance of b-d in the Y direction. Among them, e and c have different values, and f and d have different values. In other words, the orthographic projection of the second pixel unit P2 on the first light valve array substrate 51 partially overlaps (not completely overlaps) with the orthographic projection of the second pixel unit P3 on the first light valve array substrate 51.

In this embodiment, when the light valve panel with the three-layer pixel unit structure provided by the embodiment is used for three-dimensional printing, for each layer of the object to be printed, the exposure and curing process are required to be performed three times.

Figure 12:
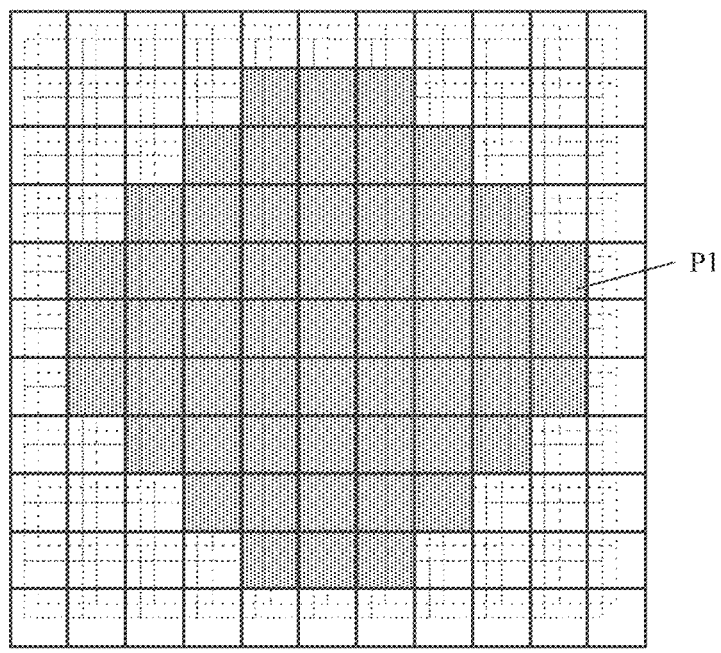
FIG. 12 is an exemplary diagram of a pixel turn-on state of a light valve panel in a first phase provided by at least one embodiment of the present disclosure.

In an exemplary embodiment, when the light valve panel provided by this embodiment is applied to the three-dimensional printing system for three-dimensional printing, in the first phase, the controller may control the first light valve array substrate 51 to operate (i.e., control the first light valve array substrate 51 to display the first exposure pattern) to allow the light emitted by the light source to selectively passes through the first light valve array substrate 51, and control the second light valve array substrate 52 and the second light valve array substrate 53 to allow all light to pass through the second light valve array substrate 52 and the second light valve array substrate 53 (i.e., the second light valve array substrate 52 and the second light valve array substrate 53 are in a fully light-transmitting state), so that the first exposure and curing process is completed. For example, the signal of the first exposure pattern (for example, the pattern illustrated in FIG. 12) is provided to the first pixel electrode layer of the first light valve array substrate 51, the common voltage signal is provided to the first common electrode layer of the first light valve array substrate 51, the signal of the fully light-transmitting state is provided to the second pixel electrode layer of the second light valve array substrate 52, the common voltage signal is provided to the second common electrode layer of the second light valve array substrate 52, the signal of the fully light-transmitting state is provided to the second pixel electrode layer of the second light valve array substrate 53, and the common voltage signal is provided to the second common electrode layer of the second light valve array substrate 53.

Figure 13:
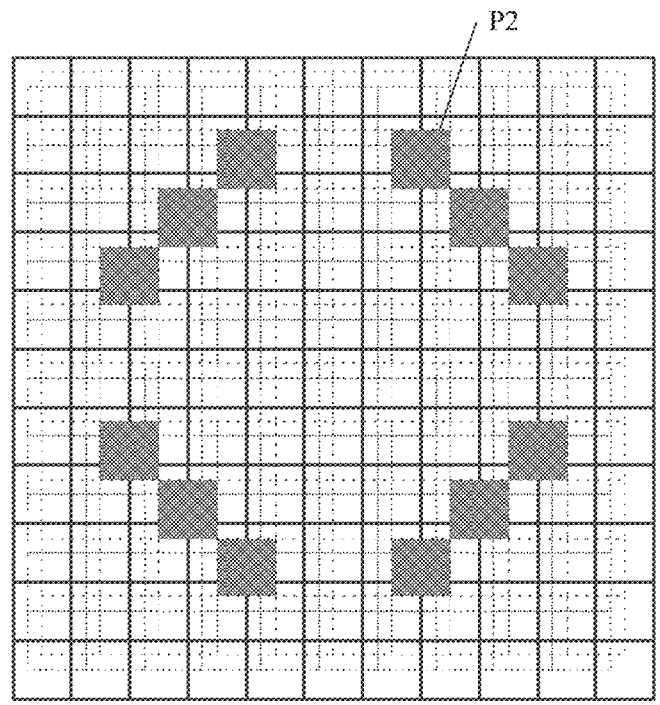
FIG. 13 is an exemplary diagram of a pixel turn-on state of a light valve panel in a second phase provided by at least one embodiment of the present disclosure.

In the second phase, the controller may control the first light valve array substrate 51 and the second light valve array substrate 53 to allow all light to pass through the first light valve array substrate 51 and the second light valve array substrate 53, and control the second light valve array substrate 52 to operate (i.e., control the second light valve array substrate 52 to display the second exposure pattern) to allow the light to selectively pass through the second light valve array substrate 52, so that the second exposure and curing process is performed. For example, the signal of the fully light-transmitting state is provided to the first pixel electrode layer of the first light valve array substrate 51, the common voltage signal is provided to the first common electrode layer of the first light valve array substrate 51, the signal of the second exposure pattern (for example, the pattern illustrated in FIG. 13) is provided to the second pixel electrode layer of the second light valve array substrate 52, the common voltage signal is provided to the second common electrode layer of the second light valve array substrate 52, the signal of the fully light-transmitting state is provided to the second pixel electrode layer of the second light valve array substrate 53, and the common voltage signal is provided to the second common electrode layer of the second light valve array substrate 53.

Figure 14:
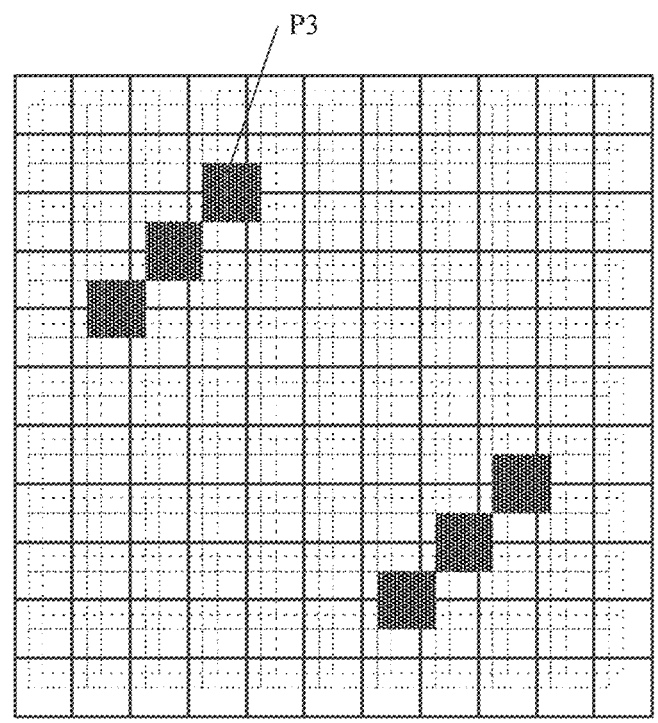
FIG. 14 is an exemplary diagram of a pixel turn-on state of a light valve panel in a third phase provided by at least one embodiment of the present disclosure.

In the third phase, the controller may control the first light valve array substrate 51 and the second light valve array substrate 52 to allow all light to pass through the first light valve array substrate 51 and the second light valve array substrate 52, and control the second light valve array substrate 53 (i.e., control the second light valve array substrate 53 to display the third exposure pattern) to allow the light to selectively pass through the second light valve array substrate 53, so that the third exposure and curing process is performed. For example, the signal of the fully light-transmitting state is provided to the first pixel electrode layer of the first light valve array substrate 51, the common voltage signal is provided to the first common electrode layer of the first light valve array substrate 51, the signal of the fully light-transmitting state is provided to the second pixel electrode layer of the second light valve array substrate 52, the common voltage signal is provided to the second common electrode layer of the second light valve array substrate 52, the signal of the third exposure pattern (for example, the pattern illustrated in FIG. 14) is provided to the second pixel electrode layer of the second light valve array substrate 53, and the common voltage signal is provided to the second common electrode layer of the second light valve array substrate 53.

Figure 15:
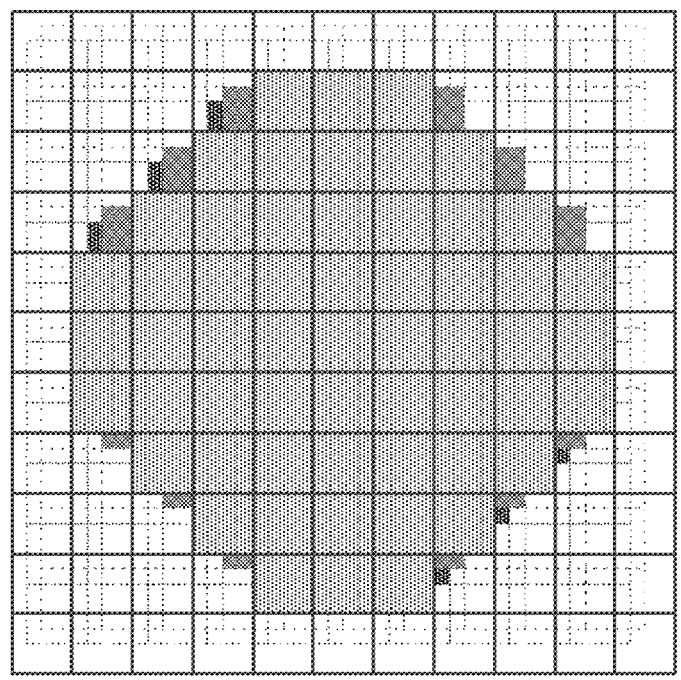
FIG. 15 is an exemplary diagram of a single-layer curing pattern obtained by using a light valve panel provided by at least one embodiment of the present disclosure.

In this way, the single-layer print pattern as illustrated in FIG. 15 can be finally obtained. In this embodiment, through three phases of exposure and curing process, the stepped sawtooth of the oblique line portion can be obviously reduced. It can be seen that, the stepped edge of the pattern cured in the first phase can be softened during the curing in the second phase and the third phase, thereby improving the accuracy of edge printing of the single-layer curing pattern and further improving the surface smoothness of 3D printed objects.

It should be noted that where the number of the second light valve array substrates is more than two, three-dimensional printing can be performed with reference to the method of this embodiment, and details are not described herein again.

Based on the technical concepts of the above embodiments, the embodiments of the present disclosure further provide a method for manufacturing a light valve panel to manufacture the light valve panel of the above embodiments.

The method for manufacturing the light valve panel includes: providing a first light valve array substrate and at least one second light valve array substrate, respectively. For example, providing the first light valve array substrate and at least one second light valve array substrate, respectively, includes: preparing the first light valve array substrate and the at least one second light valve array substrate, respectively. The first light valve array substrate includes a plurality of first pixel units arranged in an array, and the second light valve array substrate includes a plurality of second pixel units arranged in an array. Then, the method for manufacturing the light valve panel further includes: stacking the first light valve array substrate with the second light valve array substrate. For example, an orthographic projection of at least one of the second pixel units on the first light valve array substrate partially overlaps with at least one of the first pixel units.

In an exemplary embodiment, preparing the first light valve array substrate includes: sequentially forming a first common electrode layer and a first pixel electrode layer on a first base layer, and the first pixel electrode layer includes a plurality of first pixel electrodes corresponding to the plurality of first pixel units, and the plurality of first pixel electrodes are arranged in an array.

For example, preparing the second light valve array substrate includes: sequentially forming a second common electrode layer and a second pixel electrode layer on a second base layer, and the second pixel electrode layer includes a plurality of second pixel electrodes corresponding to the plurality of second pixel units, and the plurality of second pixel electrodes are arranged in an array.

For example, stacking the first light valve array substrate with the second light valve array substrate includes: assembling the first light valve array substrate with the second light valve array substrate to form a cell, and forming a first liquid crystal layer between the first pixel electrode layer and the second pixel electrode layer. For example, an orthographic projection of at least one of the second pixel electrodes on the first base layer partially overlaps with an orthographic projection of at least one of the first pixel electrodes on the first base layer. For example, in some examples, an orthographic projection of any one of the second pixel electrodes on the first base layer partially overlaps with orthographic projection of at least one of the first pixel electrodes on the first base layer.

In the exemplary embodiment, the manufacturing method of this embodiment may further include: forming a first polarizer on a side of the first light valve array substrate away from the first liquid crystal layer, and forming a second polarizer on a side of the second light valve array substrate away from the first liquid crystal layer.

In another exemplary embodiment, preparing the first light valve array substrate includes: forming a third pixel electrode layer on a third base layer, forming a third common electrode layer on a fourth base layer, and forming a second liquid crystal layer between the third pixel electrode layer and the third common electrode layer. The third pixel electrode layer includes a plurality of third pixel electrodes corresponding to the plurality of first pixel units, and the plurality of third pixel electrodes are arranged in an array.

Preparing the second light valve array substrate includes: forming a fourth pixel electrode layer on a fifth base layer, forming a fourth common electrode layer on a sixth base layer, and forming a third liquid crystal layer between the fourth pixel electrode layer and the fourth common electrode layer. The fourth pixel electrode layer includes a plurality of fourth pixel electrodes corresponding to the plurality of second pixel units, and the plurality of fourth pixel electrodes are arranged in an array.

Stacking the first light valve array substrate with the second light valve array substrate includes: disposing the first light valve array substrate on the second light valve array substrate, or disposing the second light valve array substrate on the first light valve array substrate. An orthographic projection of at least one of the fourth pixel electrodes on the third base layer partially overlaps with an orthographic projection of at least one of the third pixel electrodes on the third base layer. For example, in some examples, an orthographic projection of any one of the fourth pixel electrodes on the third base layer partially overlaps with the orthographic projection of at least one of the third pixel electrodes on the third base layer.

In the exemplary embodiment, the third base layer and the fifth base layer may be the same base layer; or the third base layer and the sixth base layer may be the same base layer, or the fourth base layer and the fifth base layer may be the same base layer, or the fourth base layer and the sixth base layer may be the same base layer.

In the exemplary embodiment, by taking the case where the fourth base layer and the fifth base layer are the same base layer as an example, providing the first light valve array substrate and the second light valve array substrate and stacking the first light valve array substrate with the second light valve array substrate may include: forming a third pixel electrode layer on the third base layer, forming a third common electrode layer on the fourth base layer, allowing the third base layer to be opposite to the fourth base layer so as to allow the third pixel electrode layer to be opposite to the third common electrode layer, and forming a second liquid crystal layer between the third pixel electrode layer and the third common electrode layer; and forming a fourth pixel electrode layer on a side, away from the second liquid crystal layer, of the fourth base layer, forming a fourth common electrode layer on the sixth base layer, allowing the fourth base layer to be opposite to the sixth base layer so as to allow the fourth pixel electrode layer to be opposite to the fourth common electrode layer, and forming a third liquid crystal layer between the fourth pixel electrode layer and the fourth common electrode layer. For example, an orthographic projection of any one of the fourth pixel electrodes on the third base layer partially overlaps with the orthographic projection of at least one of the third pixel electrodes on the third base layer.

The specific manufacturing process of the light valve panel has been described in detail in the above embodiments, and details are not described herein again.

Based on the technical concepts of the above embodiments, the embodiments of the present disclosure further provide a three-dimensional printing method, which is applied to the three-dimensional printing system of the above embodiments. The three-dimensional printing method includes: performing a first exposure (corresponding to the exposure and curing process in the first phase of the above embodiments) on a printing material through the light valve panel to obtain an initial printing layer; and performing at least one second exposure (corresponding to the exposure and curing process in the second phase or the exposure and curing process in the second phase and the third phase of the above embodiments) on the printing material through the light valve panel to obtain an edge-softened printing layer.

In this embodiment, during the printing process of any layer, at least two exposures (including one first exposure and at least one second exposure) are performed. For example, the light valve panel includes N second light valve array substrates, during the three-dimensional printing process, at least two exposures can be performed, at most N+1 exposures can be performed, and exposure patterns displayed by the light valve panel during exposures and curing process may be different.

In an exemplary embodiment, performing the first exposure on the printing material through the light valve panel to obtain the initial printing layer may include: allowing the light valve panel to display a first exposure pattern, and performing the first exposure on the printing material through the light valve panel, so as to obtain the initial printing layer.

Performing at least one second exposure on the printing material through the light valve panel to obtain the edge-softened printing layer may include: allowing the light valve panel to display a second exposure pattern, and performing at least one second exposure on the printing material through the light valve panel, so as to obtain the edge-softened printing layer.

In an exemplary embodiment, the first light valve array substrate includes: a first base layer, and a first common electrode layer and a first pixel electrode layer which are sequentially provided on the first base layer, and the first pixel electrode layer includes a plurality of first pixel electrodes corresponding to the plurality of first pixel units, and the plurality of first pixel electrodes are arranged in an array; the second light valve array substrate includes: a second base layer, and a second common electrode layer and a second pixel electrode layer which are sequentially provided on the second base layer, and the second pixel electrode layer includes a plurality of second pixel electrodes corresponding to the plurality of second pixel units, and the plurality of second pixel electrodes are arranged in an array; a first liquid crystal layer is provided between the first pixel electrode layer and the second pixel electrode layer; and an orthographic projection of any one of the second pixel electrodes in the second light valve array substrate on the first base layer partially overlaps with an orthographic projection of at least one of the first pixel electrodes on the first base layer.

In this case, allowing the light valve panel to display a first exposure pattern may include: providing a signal of the first exposure pattern to the first pixel electrode layer, and providing a common voltage signal to the first common electrode layer, the second pixel electrode layer, and the second common electrode layer.

Allowing the light valve panel to display the second exposure pattern includes: providing a signal of the second exposure pattern to the second pixel electrode layer, and providing a common voltage signal to the first common electrode layer, the first pixel electrode layer, and the second common electrode layer.

In another exemplary embodiment, the first light valve array substrate includes: a third base layer, a third pixel electrode layer, a second liquid crystal layer, a third common electrode layer, and a fourth base layer, the third base layer, the third pixel electrode layer, the second liquid crystal layer, the third common electrode layer, and the fourth base layer are sequentially stacked, and the third pixel electrode layer includes a plurality of third pixel electrodes corresponding to the plurality of first pixel units, and the plurality of third pixel electrodes are arranged in an array; the second light valve array substrate includes: a fifth base layer, a fourth pixel electrode layer, a third liquid crystal layer, a fourth common electrode layer, and a sixth base layer, the fifth base layer, the fourth pixel electrode layer, the third liquid crystal layer, the fourth common electrode layer, and the sixth base layer are sequentially stacked, and the fourth pixel electrode layer includes a plurality of fourth pixel electrodes corresponding to the plurality of second pixel units, and the plurality of fourth pixel electrodes are arranged in an array; and an orthographic projection of any one of the fourth pixel electrodes in the second light valve array substrate on the third base layer partially overlaps with an orthographic projection of at least one of the third pixel electrodes on the third base layer.

In this case, allowing the light valve panel to display a first exposure pattern includes: providing a signal of the first exposure pattern to the third pixel electrode layer, and providing a common voltage signal to the third common electrode layer, the fourth pixel electrode layer, and the fourth common electrode layer.

Allowing the light valve panel to display the second exposure pattern includes: providing a signal of the second exposure pattern to the fourth pixel electrode layer, and providing a common voltage signal to the fourth common electrode layer, the third pixel electrode layer, and the third common electrode layer.

The specific process of the three-dimensional printing method has been described in detail in the above embodiments, and details are not described herein again.

The following statements should be noted.

(1) The accompanying drawings involve only the structure(s) in connection with the embodiment(s) of the present disclosure, and other structure(s) can be referred to common design(s).

(2) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the

What is claimed is:

1. A light valve panel, comprising:
   a first light valve array substrate and at least one second light valve array substrate, the first light valve array substrate and the at least one second light valve array substrate being arranged in a stack,
   wherein the first light valve array substrate comprises a plurality of first pixel units arranged in an array,
   the second light valve array substrate comprises a plurality of second pixel units arranged in an array, and
   an orthographic projection of at least one of the second pixel units on the first light valve array substrate partially overlaps with at least one of the first pixel units;
   wherein the first light valve array substrate comprises: a third base layer, a third pixel electrode layer, a second liquid crystal layer, a third common electrode layer, and a fourth base layer,
   the third base layer, the third pixel electrode layer, the second liquid crystal layer, the third common electrode layer and the fourth base layer are sequentially stacked, and the third pixel electrode layer comprises a plurality of third pixel electrodes corresponding to the plurality of first pixel units, and the plurality of third pixel electrodes are arranged in an array;
   the second light valve array substrate comprises: a fifth base layer, a fourth pixel electrode layer, a third liquid crystal layer, a fourth common electrode layer, and a sixth base layer,
   the fifth base layer, the fourth pixel electrode layer, the third liquid crystal layer, the fourth common electrode layer and the sixth base layer are sequentially stacked, and the fourth pixel electrode layer comprises a plurality of fourth pixel electrodes corresponding to the plurality of second pixel units, and the plurality of fourth pixel electrodes are in an array; and
   the orthographic projection of at least one of the second pixel units on the first light valve array substrate partially overlapping with at least one of the first pixel units comprises: an orthographic projection of at least one of the fourth pixel electrodes in the second light valve array substrate on the third base layer partially overlaps with an orthographic projection of at least one of the third pixel electrodes on the third base layer.

2. The light valve panel according to claim 1, wherein the orthographic projection of at least one of the second pixel units on the first light valve array substrate partially overlapping with at least one of the first pixel units comprises:
   the orthographic projection of at least one of the second pixel units on the first light valve array substrate partially overlaps with the at least one of the first pixel units in a first direction and a second direction, respectively, or
   the orthographic projection of at least one of the second pixel units on the first light valve array substrate partially overlaps with the at least one of the first pixel units in the first direction, or
   the orthographic projection of at least one of the second pixel units on the first light valve array substrate partially overlaps with the at least one of the first pixel units in the second direction,
   wherein both the first direction and the second direction are parallel to a plane in which the first light valve array substrate is located, and the first direction is perpendicular to the second direction.

3. The light valve panel according to claim 2, wherein the orthographic projection of at least one of the second pixel units on the first light valve array substrate partially overlaps with four adjacent first pixel units, and the four adjacent first pixel units are in two rows and two columns, respectively.

4. The light valve panel according to claim 3, wherein an area of an overlapping region of the at least one of the second pixel units with each of the four adjacent first pixel units is identical.

5. The light valve panel according to claim 1, wherein the orthographic projection of at least one of the fourth pixel electrodes in the second light valve array substrate on the third base layer partially overlapping with the orthographic projection of at least one of the third pixel electrodes on the third base layer comprises:
an orthographic projection of any one of the fourth pixel electrodes in the second light valve array substrate on the third base layer partially overlaps with the orthographic projection of at least one of the third pixel electrodes on the third base layer.

6. The light valve panel according to claim 1, wherein the third base layer and the fifth base layer are an identical base layer, or the third base layer and the sixth base layer are an identical base layer, or the fourth base layer and the fifth base layer are an identical base layer, or the fourth base layer and the sixth base layer are an identical base layer.

7. The light valve panel according to claim 1, wherein the at least one second light valve array substrate comprises two or more second light valve array substrates, and an orthographic projection of at least one second pixel unit in one of any two second light valve array substrates on the first light valve array substrate partially overlaps with an orthographic projection of at least one second pixel unit in another one of the any two second light valve array substrates on the first light valve array substrate.

8. The light valve panel according to claim 2, wherein the first light valve array substrate and the second light valve array substrate are identical, and
the first light valve array substrate and the second light valve array substrate are staggered in the first direction and the second direction, or the first light valve array substrate and the second light valve array substrate are staggered in the first direction, or the first light valve array substrate and the second light valve array substrate are staggered in the second direction.

9. A three-dimensional printing system, comprising:
a light source, and
a light valve panel, wherein the light valve panel is on a light-emitting side of the light source;
wherein the light valve panel comprises:
a first light valve array substrate and at least one second light valve array substrate, the first light valve array substrate and the at least one second light valve array substrate being arranged in a stack,
wherein the first light valve array substrate comprises a plurality of first pixel units arranged in an array,
the second light valve array substrate comprises a plurality of second pixel units arranged in an array, and
an orthographic projection of at least one of the second pixel units on the first light valve array substrate partially overlaps with at least one of the first pixel units;
the three-dimensional printing system further comprises:
a controller that is in signal connection to the first light valve array substrate and the second light valve array substrate of the light valve panel, respectively,
wherein the controller is configured to obtain a first exposure pattern for the first light valve array substrate and a second exposure pattern for the second light valve array substrate according to a print pattern, and is further configured to control the light valve panel to provide the first exposure pattern and control the light valve panel to provide the second exposure pattern, and
the print pattern is obtained by superimposing the first exposure pattern and the second exposure pattern;
wherein the first light valve array substrate comprises: a third base layer, a third pixel electrode layer, a second liquid crystal layer, a third common electrode layer, and a fourth base layer, the third base layer, the third pixel electrode layer, the second liquid crystal layer, the third common electrode layer and the fourth base layer are sequentially stacked, and the third pixel electrode layer comprises a plurality of third pixel electrodes corresponding to the plurality of first pixel units, and the plurality of third pixel electrodes are arranged in an array;
the second light valve array substrate comprises: a fifth base layer, a fourth pixel electrode layer, a third liquid crystal layer, a fourth common electrode layer, and a sixth base layer, the fifth base layer, the fourth pixel electrode layer, the third liquid crystal layer, the fourth common electrode layer and the sixth base layer are sequentially stacked, and the fourth pixel electrode layer comprises a plurality of fourth pixel electrodes corresponding to the plurality of second pixel units, and the plurality of fourth pixel electrodes are in an array;
an orthographic projection of any one of the fourth pixel electrodes in the second light valve array substrate on the third base layer partially overlaps with an orthographic projection of at least one of the third pixel electrodes on the third base layer;
the controller is further configured to provide a signal of the first exposure pattern to the third pixel electrode layer, and provide a common voltage signal to the third common electrode layer, the fourth pixel electrode layer, and the fourth common electrode layer, so as to control the light valve panel to provide the first exposure pattern; and
the controller is further configured to provide a signal of the second exposure pattern to the fourth pixel electrode layer, and provide a common voltage signal to the fourth common electrode layer, the third pixel electrode layer, and the third common electrode layer, so as to control the light valve panel to provide the second exposure pattern.

* * * * *